United States Patent [19]

Meek et al.

[11] Patent Number: 4,686,365

[45] Date of Patent: Aug. 11, 1987

[54] FOURIER TRANSFORM ION CYCLOTHON RESONANCE MASS SPECTROMETER WITH SPATIALLY SEPARATED SOURCES AND DETECTOR

[75] Inventors: John T. Meek, Mercer County, N.J.; Gerald W. Stockton, Bucks County, Pa.

[73] Assignee: American Cyanamid Company, Stamford, Conn.

[21] Appl. No.: 685,811

[22] Filed: Dec. 24, 1984

[51] Int. Cl.[4] .............................................. B01D 59/44

[52] U.S. Cl. .................................... 250/281; 250/290; 250/291

[58] Field of Search ............... 250/281, 282, 290, 291, 250/292, 293, 288

[56] References Cited

U.S. PATENT DOCUMENTS

| | | | |
|---|---|---|---|
| 3,922,543 | 11/1975 | Beauchamp | 250/291 |
| 3,984,681 | 10/1976 | Fletcher et al. | 250/291 |
| 4,464,570 | 8/1984 | Alleman et al. | 250/291 |
| 4,535,235 | 8/1985 | McGiver | 250/282 |

OTHER PUBLICATIONS

Wilkins et al., Fourier Transform Mass Spectrometry for Analysis, Anal. Chem., vol. 53, No. 14 (12-1981), 1661A-1676A.

Heddle et al., The Focal Properties of Three Element Electrostatic Electron Lenses, J. Phys. E., vol. 3 (7-1970), 552-4.

*Primary Examiner*—Carolyn E. Fields

*Assistant Examiner*—Paul A. Guss

*Attorney, Agent, or Firm*—Estelle J. Tsevdos

[57] ABSTRACT

A Fourier transform ion cyclotron resonance (ICR) mass spectrometer, with a vacuum housing comprising three differentially pumped regions allows spatial separation of the processes for generation, translocation, and detection of the ionic species. The ion source provides inlets for solid, liquid, and gaseous samples from direct injection or chromatographic interfaces. Provision is made for ionization by electron impact, chemical ionization, fast atom bombardment, and laser ionization. A system of electrostatic lenses accelerates, focusses, and decelerates the ions for transmission to the ion detector. The mass analyzer includes an ion cyclotron resonance cell in which the ionic motions are detected by amplification of a small "image" current induced in the walls of the cell and made to flow through external detection circuitry. The characteristic frequencies of the ionic motions are revealed by Fourier transformation of the digitized image current, and related to the ionic masses by a simple algebraic calibration function. High resolution and accuracy in the measured masses are achieved through the ultra high vacuum in the analyzer region, and the use of very large data tables for the digital representation of the image current. Such large data arrays (typically 512K words) require the use of a high speed array processor for the Fourier transformation and other mathematical processing, and high capacity magnetic storage media for the mass spectral data arrays. Electronic circuitry achieves an extremely large dynamic range in the ICR mass measurement.

29 Claims, 11 Drawing Figures

SPG
SYN
XMTR
ICR
GAS
PRG
TO HOST
TO MODULES
PRE
AGC
TO PRG
TO HOST
LOC
MXR
FLTR
ADC1
BUFR
ALU
ARRAY
DISC1
HOST
DISC2
TO MODULES
TAPE
PLOTR
DISP
PRTR
KBD
SHAFT
DAC
OPT
TO ION OPTICS
R
100
96
98
102
87
150
104
108
133
132
135
134
106
136
138
140
142
144
92
146
148
158
156
154
152
94
91

FOURIER TRANSFORM ION CYCLOTHON RESONANCE MASS SPECTROMETER WITH SPATIALLY SEPARATED SOURCES AND DETECTOR

BACKGROUND OF THE INVENTION

This invention relates to mass spectroscopy in general, and more particularly to an improved method and apparatus for carrying out ion cyclotron resonance spectroscopy.

High resolution mass spectrometry (MS) is used widely in chemistry for the elucidation of molecular structures and the study of numerous chemical and physical processes. A knowledge of an accurate mass measurement for an unknown molecule enables the chemist to reduce the number of possible structures to a short list. The resolution and mass-accuracy achievable with the most powerful of the commercial high resolution spectrometers does not yet eliminate entirely the need for interpretation of the spectrum and intuitive deduction by the chemist in arriving at a probable structure for a compound. Definitive structures for even moderately large molecules are rarely achieved and other forms of spectroscopy are usually needed to supplement the information obtained. The rate of advancement of the traditional scanning magnetic sector mass spectrometer has slowed due to technological limitations in magnet stability and the optical slits, and no dramatic improvements in resolution and mass-accuracy seem likely in the foreseeable future. Also, the recent improvements in chromatographic technology have surpassed the ability of the scanning magnetic sector instruments to obtain a spectrum in the time available (i.e. within the chromatographic peak width).

It has been recognized that ion cyclotron resonance (ICR) offers the greatest opportunity for major advances in the art of high resolution mass spectrometry. This is discussed by C. L. Wilkins and M. L. Gross in Analyl. Chem. 53, 1661-1668 (1981). For example, while the magnetic sector instrument achieves a resolution of ten thousand and a mass accuracy of 10 to 15 ppm in routine experiments ICR spectrometers commonly achieve a resolution exceeding one million and mass accuracies under 1 ppm. With this level of performance, completely unambiguous structure-determinations (excluding isomeric forms) should be possible for quite large molecules. In the ICR experiment, the ions are trapped by an applied electrostatic field and forced to undergo orbital (cyclotron and magnetron) motions at characteristic frequencies by the presence of a strong, uniform magnetic field.

The observable electrical signal arising from the motions of an ensemble of trapped ions of a single mass would be an exponentially-decaying sine wave (the rate of decay is determined by the frequency of collision between ionic and neutral molecules). For several different ionic masses, the ionic motions are reflected in a complex fluctuating signal made up of interferring sine waves of different frequencies and phases. This time-domain transient signal is often called an "interferogram" or simply a "transient." The individual frequency components of the interferogram are rendered observable by Fourier transformation, which is facilitated by digitizing the interferogram and storing its discrete binary representation in the memory of a digital computer where it can be processed numerically.

For a given mass observation range, the resolution and accuracy obtainable in the ICR experiment are limited by different factors, depending on the nature of the sample. In experiments with solid samples of low vapour pressure, the mass resolution is limited by the size of the digital memory available for storage of the interferogram, whereas, with chromatographic sources, the resolution is limited by the quality of the vacuum attainable in the mass analyzer. In either case, the accuracy of the measured masses is limited by the accuracy of the calibration function.

The two commerical ICR mass spectrometers available currently have several limitations. Routine use of gas and liquid chromatographic interfaces and a variety of modern ionization techniques are beyond the capability of the commercial ICR instruments. In these spectrometers, the ions are formed and mass-analyzed in the same region of physical space—inside a trapping cell 19 of about one cubic inch in volume. Mass-resolution in the ICR experiment increases with decreasing pressure and significant gains in performance are achieved only at working pressures of $10^{-8}$ torr or lower. The prior art instruments were designed with a fundamental limitation which renders them unsuitable for use with chromatographic-sample sources: it is impossible to inject a liquid or gaseous stream at near-atmospheric pressure into the ICR cell and maintain a satisfactory operating pressure for high resolution mass measurements. Consequently, applications of these instruments have so far been restricted in scope to solid-probe experiments.

In order to accomodate chromatographic sources, it is apparent that the ion source and detection regions must be spatially separated and differentially pumped to achieve the required ultra-high vacuum in the analyzer region. If satisfactory differential pumping can be achieved, the problem is reduced to one of transporting the ions to, and trapping them in, the ICR mass-analyzer cell.

Summary of the Invention

The method and apparatus of the present invention provides mechanical and electronic means to separate spatially the sample-introduction and ionization steps from the mass analysis step, thereby facilitating the interfacing of gas and liquid chromatographic sample-sources and implementation of several modern ionization techniques, and includes electronic means to improve the dynamic range, resolution, accuracy, and speed of the ionic mass measurement. The major improvement over prior art mass spectrometers arises in the use of electrostatic lenses for the transportation of ions from the sample-injection/ion-source region and that of the mass analyzer.

Alternative means to separate the ion source and mass analyzer in an ICR mass spectrometer have been discussed by others. In particular, Smith and Futrell, Int. J. Mass. Spectrom. Ion Physics 14, [11-18] (1984) used an 180 degree magnetic sector to guide ions from the source to the ICR analyzer. Their apparatus is placed between the pole gaps of a low-field electromagnet, but the geometry of the magnetic sector is not appropriate for use with higher field superconducting solenoid magnets. For a cryogenic magnet, McIver et al. in 32nd Annual Conference on Mass Spectrometry and Allied Topics, San Antonio, Tex. (1984) proposed a radio frequency (RF) quadrupolar electric field to guide the ions from the ion source to the analyzer region, requiring the use of extremely long quadrupole rods (about 1 meter long).

There are several fundamental reasons why electrostatic lenses are preferred, and why the use of quadrupole rods imposes unnecessary limitations on the performance of the spectrometer. The system of electrostatic lenses described herein produces a tightly collimated ion beam focused along the principal axis of the magnetic field, which provides the most direct trajectory. The trajectory of an ion within an RF quadrupolar field is circuitous and the longer path length increases the probability of reactive collisions. The ions leaving the quadrupole rods have high velocities and widely diverging trajectories, making trapping in the ICR cell difficult at best. The transmission of high masses by quadrupole rods is inefficient, and the introduction of velocity-components perpendicular to the magnetic field increases the probability of ions striking the rods and of magnetic reflection. Long quadrupole rods exhibit poor pumping conductance and RF leakage from the rods can interfere with the detection of the ICR image current. Also, they are difficult and expensive to manufacture.

In the present invention, a vacuum chamber comprising three differentially-pumped regions is used to contain a versatile inlet system and ion source, an ion-optics system for the transportation of ions to the analyzer region, and an ICR ultra-high-resolution mass-analyzer. The ICR cell is situated in the homogeneous field of a large-bore cryogenic superconducting magnet. The high magnetic field of the cryogenic magnet is desirable since resolution improves and the upper mass limit is extended with increasing field strength. Samples are introduced into an ion source in the first vacuum chamber at a pressure of $<10^{-3}$ torr, where they are volatilized and ionized by one of several methods: electron impact (EI), chemical ionization (CI), fast atom bombardment (FAB), or laser ionization (LI). Due to the solenoidal geometry of the cryogenic magnet, the ion source must be located about 1.5 meters from the ICR cell, and a system of electrostatic lenses is used to transport the ions over this distance.

The ions are extracted from the source by an electrostatic lens and moved to the second, differentially-pumped chamber at a pressure of $<10^{-6}$ torr, where they enter a low resolution mass-filter (a short RF quadrupole operated usually in the "RF only" mode, where it acts as a high-pass mass filter) to discriminate against unwanted low-mass ions (e.g. reagent or carrier gas ions), and to provide single ion monitoring capability. The mass filter can be disabled electronically in certain experiments, without degradation of transmission efficiency. The ions leaving the mass filter are accelerated and focused into a tightly collimated beam, which is steered by electrostatic deflector plates through the orifice between the second and third vacuum chambers. The ions entering the third vacuum region, at a pressure of $<10^{-9}$ torr, are refocused by an electrostatic retardation lens, wherein they are decelerated to almost thermal velocity prior to entering the ICR cell. This scheme produces a tightly collimated ion beam moving close to the Z-axis of the magnet to minimize Lorentz forces (the vector cross product between the velocity V and the magnetic field B) acting on the ions.

The initial acceleration of the ions in the inhomogeneous magnetic field and final deceleration in the homogeneous field are used to overcome the reflection phenomenon associated with charged particles moving in a magnetic field gradient (See the Jackson text cited below). Magnetic reflection occurs when the ratio of the perpendicular to the parallel components of the velocity exceeds a threshhold value. Since the perpendicular (X and Y) components of the velocity are determined by the thermal energy of the ions, magnetic reflection can be overcome simply by making the Z-component of the velocity sufficiently large. However, high velocity ions are not easily trapped in the ICR cell and a retardation lens must be provided to decelerate the ions as they enter the homogeneous region of the field.

When a potential difference (trapping voltage) is applied between the side and end plates of the ICR cell, packets of ions can be confined within the volume of the cell. At pressures less than $10^{-9}$ torr, ions can be trapped for periods of several minutes. The ions are detected through observation of the image current induced in the side plates of the ICR cell. This current is amplified, digitized, and stored in the memory of a digital computer. Post-acquisition Fourier transformation renders the frequencies, and hence the accurate masses, measurable simultaneously for many different ions.

In the Fourier transform experiment, the need to generate a discrete digital representation of the measured signal causes limitations in dynamic range (the ratio of the largest to the smallest signal that can be represented numerically), in resolution, and in mass accuracy. In ICR experiments using chromatographic sources, the required dynamic range can exceed one million. Available analog-to-digital converters of sufficient speed limit the dynamic range to a few thousand. Therefore, electronic circuitry was devised to overcome this limitation and expand the dynamic range to the natural limits imposed by physics of the ion trap. The discrete representation of the ICR signal causes difficulty in measuring the exact mass because the frequency corresponding to a given mass may fall between two data points. This problem can be minimized by the use of a very large digital memory, and interpolation algorithms to calculate the accurate mass. Ordinary solid-state memory is too slow for high speed acquisitions into large tables and a special ultra-fast partitionable buffer memory (200 MB/sec burst rate, 4 MB capacity) was incorporated in the apparatus. The provision of arithmetic logic circuitry in the buffer memory allowed signal averaging for noise reduction.

The illustrated embodiment of the Fourier transform ICR spectrometer described herein provides the benefits of solid probe, as well as gas and liquid chromatographic inlets, while providing extremely high resolution and mass accuracy possible only with the ICR method of mass analysis. Furthermore, with the inclusion of several volatilization and ionization methods (EI, CI, FAB and LI), and novel electronic means to improve digital resolution and dynamic range, this invention constitutes an advance in the technology of mass spectroscopy, as well as ion cyclotron resonance spectroscopy, and satisfies a need which exists in the art.

DETAILED DESCRIPTION

Figure 1:
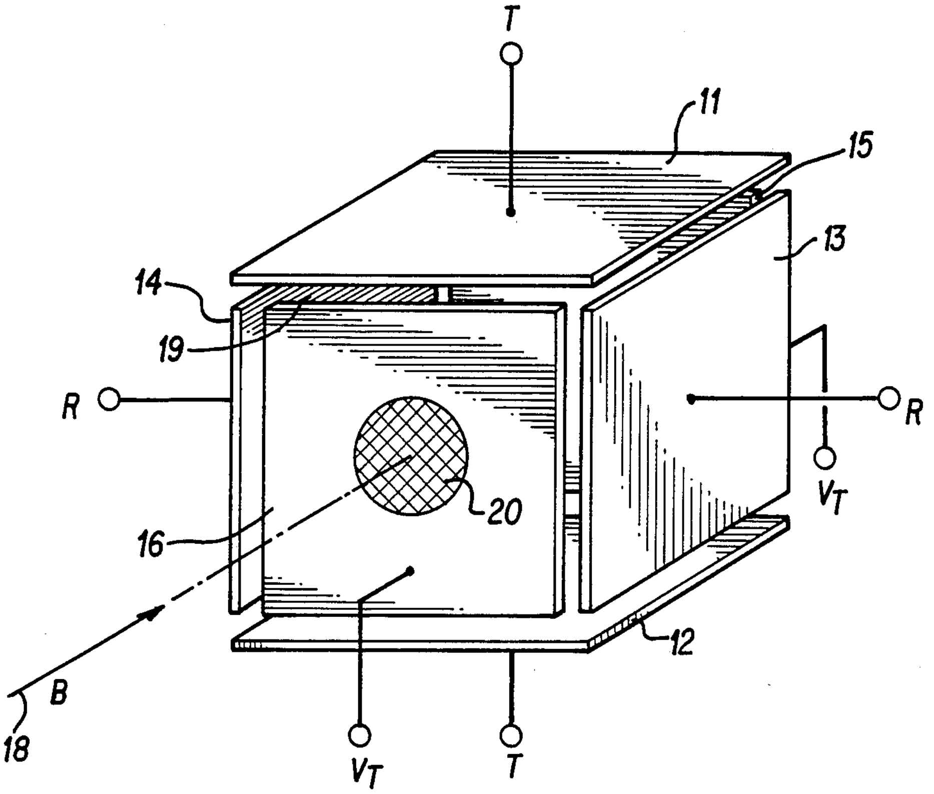
FIG. 1 is a schematic illustration of an ion cyclotron resonance (ICR) detection cell.

An illustration of an ICR trapping cell is shown in FIG. 1. Illustrated are six plates, 11–16, arranged in pairs to form a cubical space comprising a trapping cell 19. Potentials are applied across the pairs of plates and a magnetic field B is provided in the directions of arrow 18. The static electrical potentials applied to the walls of the cell, in combination with the applied magnetic field, create forces which restrict the ion motions to the interior of the cell. The orbital motions of the ions can be accelerated to larger radii by the application of a radio frequency oscillating electric field, and these motions can be detected by the observation of electric currents ("image" currents) induced in the walls of the cell. For an ion of mass m and charge q, entering the cubical space through a screen 20 and moving in a magnetic field B, the cyclotron motion occurs at an angular frequency, approximated by the sample formula: $\omega = qB/m$ (note that there exists a more exact relation containing higher-order terms, which arise from the presence of the trapping fields and space-charged effects). Thus, the ionic mass can be deduced by measuring the cyclotron frequency. Furthermore, many different masses can be measured simultaneously using Fourier transform techniques.

Figure 2:
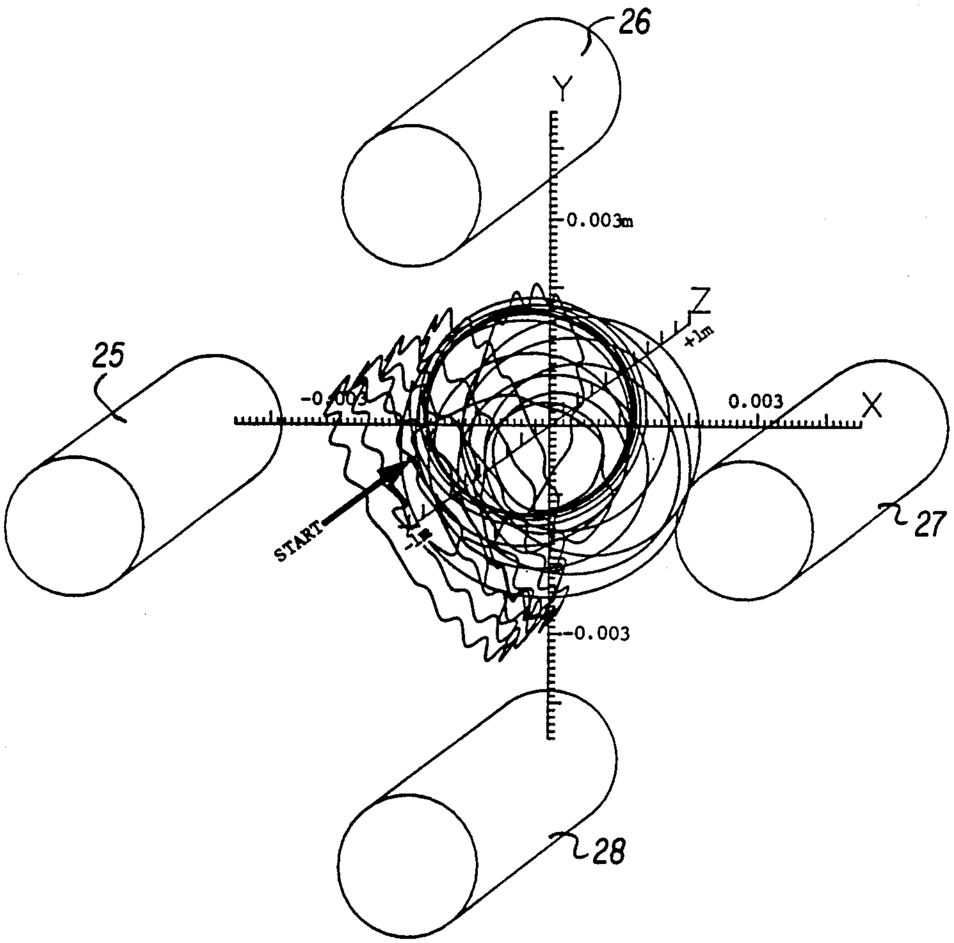
FIG. 2 is a computer simulation of the trajectory of an ion of mass 100 amu guided by a radio frequency quadrupolar electric field into the bore of a 7 Tesla superconducting solenoidal magnet, shown in a three-dimensional view.
Figure 3:
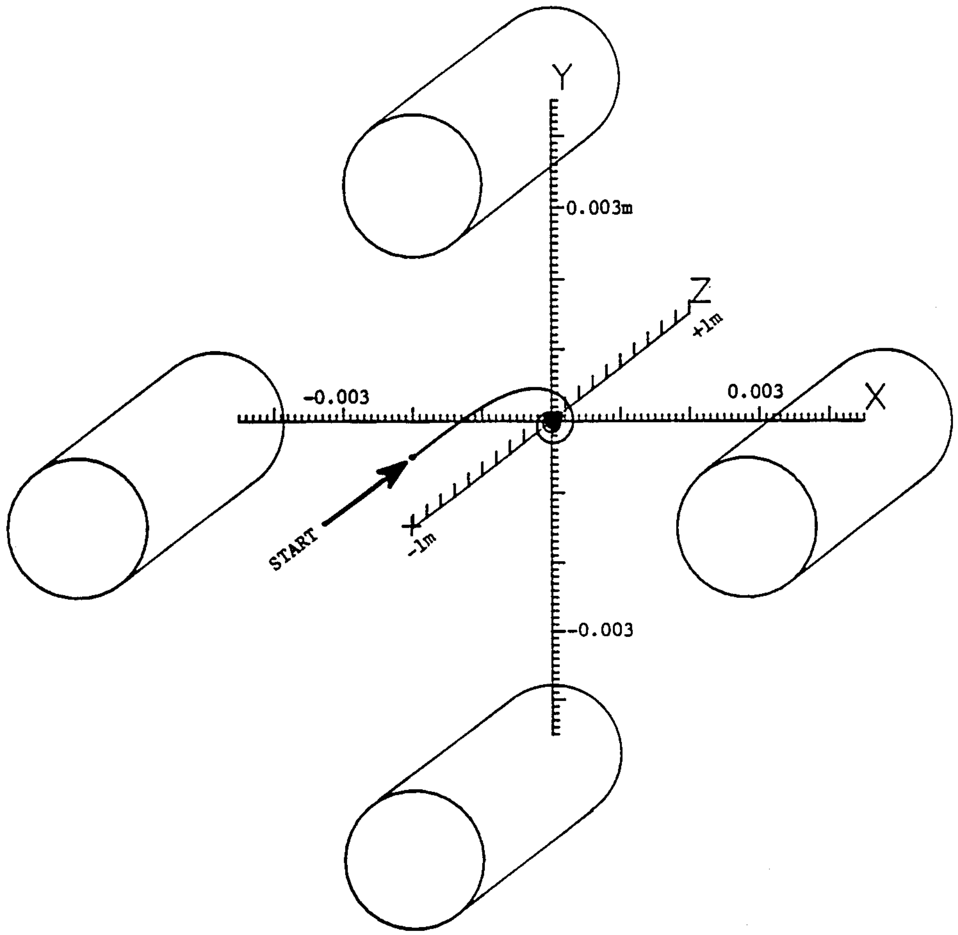
FIG. 3 is a computer simulation of the trajectory of an ion of mass 100 amv moving into the bore of a 7 Tesla superconducting solenoidal magnet.

To demonstrate these advantages of electrostatic lenses, computer simulations of ion trajectories are presented in FIGS. 2 and 3. FIG. 2 illustrates the trajectory of an ion injected into a radio frequency quadrupolar electric field generated by rods 25–28 at a distance of one meter from the center of a 7 Tesla superconducting magnet. The principal axis of the magnetic field is along the z-direction of the reference frame and the field strength is maximum at position (0,0,0). The initial position of the ion is at X=0, Y=0.001, Z=−1 m, and the ion moves in the position z-direction. The quadrupole rods end at Z=0. The scale of the illustration is distorted to show sufficient detail. At this initial position, the magnetic field is weak and the ion is forced to undergo a complex oscillatory motion due to its interaction with the fluctuating electric field. As the ion moves to stronger magnetic field strengths, its motion becomes orbital due to the domination of the magnetic interactions over the electric interactions. If the frequency of the electric field is near a harmonic of the cyclotron frequency for the ion, the ion will be accelerated into a larger orbit and may collide with the quadrupole rods or be reflected away from the magnet. The initial velocity of the ion, its mass/charge ratio, the peak-to-peak voltage on the quadrupole rods, and its position in the magnetic field all affect the trajectory of the ion.

FIG. 3 illustrates a computer simulation of the trajectory of an identical ion (same initial velocity, and position) moving parallel to the principal axis of a static magnetic field, with the quadrupolar electric field turned off. The quadrupole rods, shown for comparison with FIG. 2, are inoperative. The principal axis of the magnetic field is along the z-direction of the reference frame and the field strength is maximum at position (0,0,0). The initial position of the ion is at X=0, Y=0.001, Z=1 m, and the ion moves in the positive z-direction. The scale of the illustration is distorted to show sufficient detail. Clearly, the generation of the collimated ion-beam accelerated along the principal axis of the magnetic field will provide a more direct and controllable pathway to the mass-analyzer. In these simulations, the magnetic field was approximated by numerical integration of the Biot-Savart equation (J. D. Jackson, Classical Electrodynamics, John Wiley & Sons, Inc., N.Y., 1975), and the quadrupolar electric field was calculated exactly.

Figure 4A:
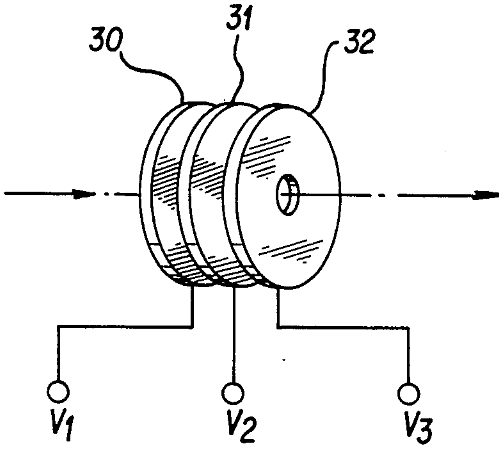
FIG. 4 illustrates typical configurations for electrostatic lenses: (A) a three-element aperture lens; and (B) a three-element cylinder lens.
Figure 4B:
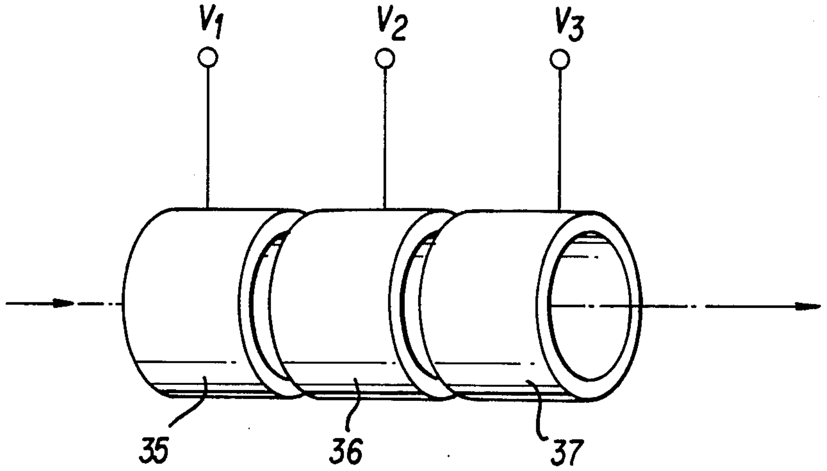

Examples of electrostatic lenses are shown in FIGS. 4A and B, wherein a three-element aperture (disc) lens made up of discs 30–32 and three-element cylinder lens are illustrated. More complex lenses can be constructed with additional elements. Adjustable electrical potentials $V_1$, $V_2$ and $V_3$ are applied to the individual lens elements to determine the optical characteristics. Depending upon the physical geometry of the lens elements and the values of the electrical potentials applied to each element, electrostatic lenses $V_1$, $V_2$ and $V_3$ will mimic a variety of optical lenses in their ability to focus diverging beams. Moreover, they can be made to accelerate, decelerate, or leave unchanged the velocity of an ion beam. The special case where the potentials on the outer elements, e.g., 30 and 31 or 35 and 37 are equal and the central element is held at a different potential is called an "einzel" lens. A detailed treatment of the design of electrostatic lenses is given in E. Harting and F. H. Read, Electrostatic Lenses, Elsevier Scientific Publishing Company, New York, 1976, although cases where magnetic fields are present are not discussed. In the present work, the optical properties of a three-element einzel cylinder lens are calculated by numerical solution of the electrostatic boundary-value problem where the electric field obtained by differentiation of the computed potentials and the magnetic field is calculated as discussed previously.

Figure 5:
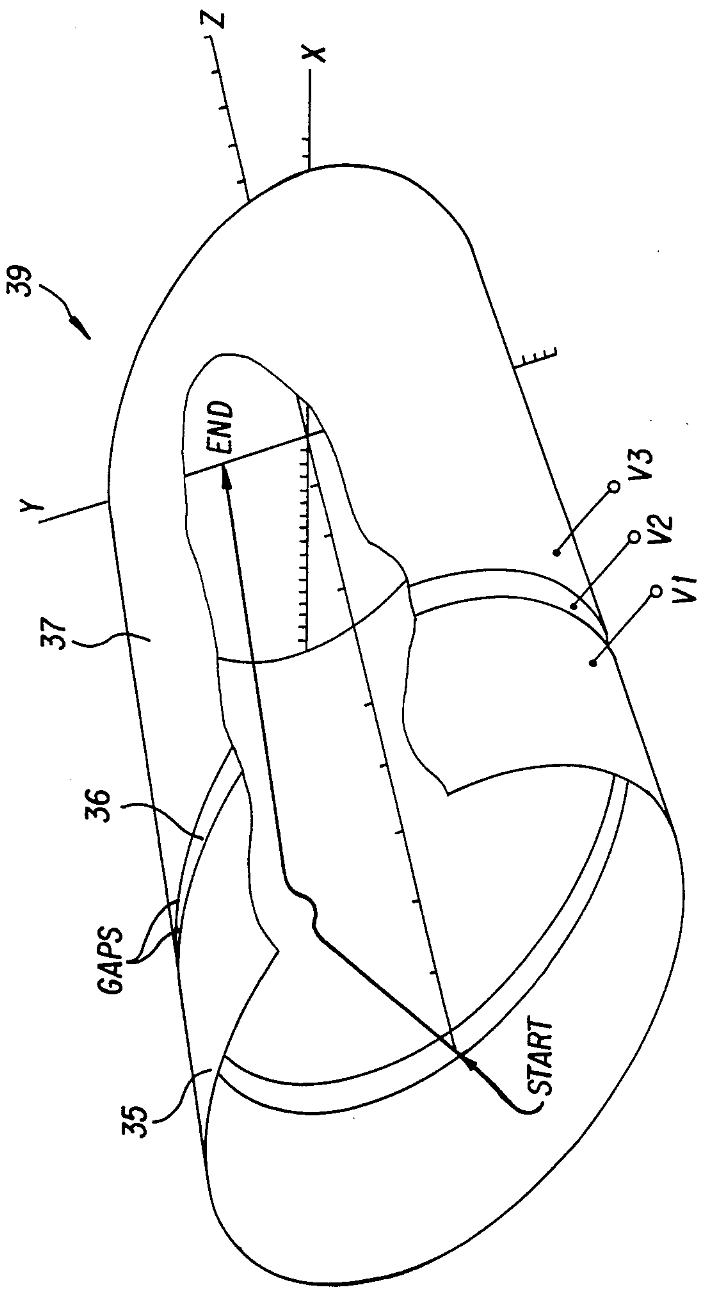
FIG. 5 is computer simulations of ion trajectories through a three-element electrostatic cylinder lens in the absence of a magnetic field, shown in a three-dimensional cut-away view.
Figure 6:
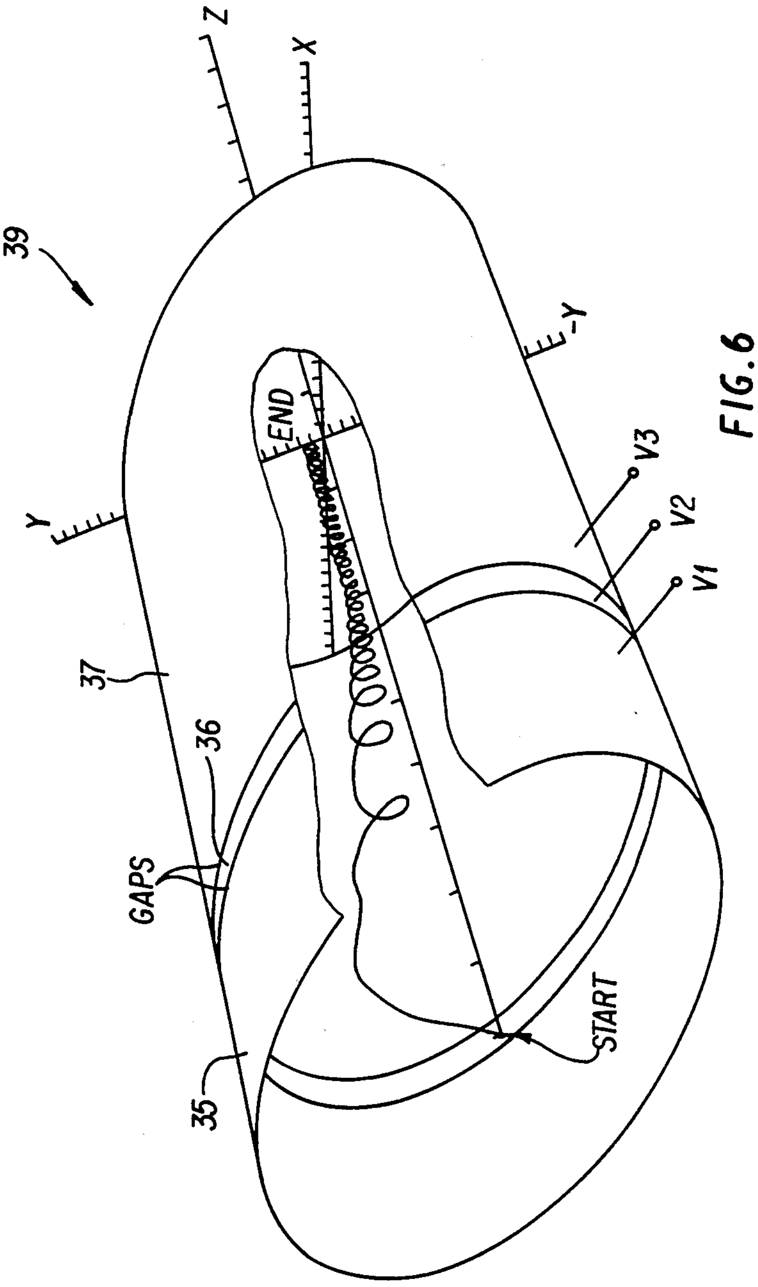
FIG. 6 is computer simulations of ion trajectories through a three-element electrostatic cylinder lens in the presence of a magnetic field gradient increasing in the positive z-direction, shown in a three-dimensional cut-away view.

The trajectory of an ion beam through an einzel lens 39 is modified by the presence of a static magnetic field, as shown in FIGS. 5 and 6. Computer-simulated trajectories respectively in the absence and presence of a magnetic field are calculated for ions of mass 100 with a total energy of 40 eV. The outer elements of the lens are held at the potential of the beam (V1=V3=40 V) and the potential V2 of the central element is −84 V. Note that the scale is distorted to show sufficient detail: the cylinder is 1 m long by 3.8 cm diameter and the gaps between the cylinders are 3.8 mm. The initial position and trajectory of the ion beam is indicated by the arrow labeled "START.." In FIG. 5, the ion beam has initially a large radial component of velocity which is removed by its interaction with the inhomogeneous electric field within the lens.

In FIG. 6, with a magnet field applied although the entering ion beam has substantial radial velocity, the electrostatic lens yields an emerging ray moving parallel to the z-axis, even though a small cyclotron motion is present. These simulations show that satisfactory optical properties can still be achieved in the presence of a strong axial magnetic field gradient, even though the ions undergo cyclotron motion about a small radius. The ions are not accelerated to large cyclotron orbits by the electrostatic lens, in contrast to their behaviour in an RF quadrupolar field, which is shown in FIG. 2.

MECHANICAL CONFIGURATION

Figure 7:
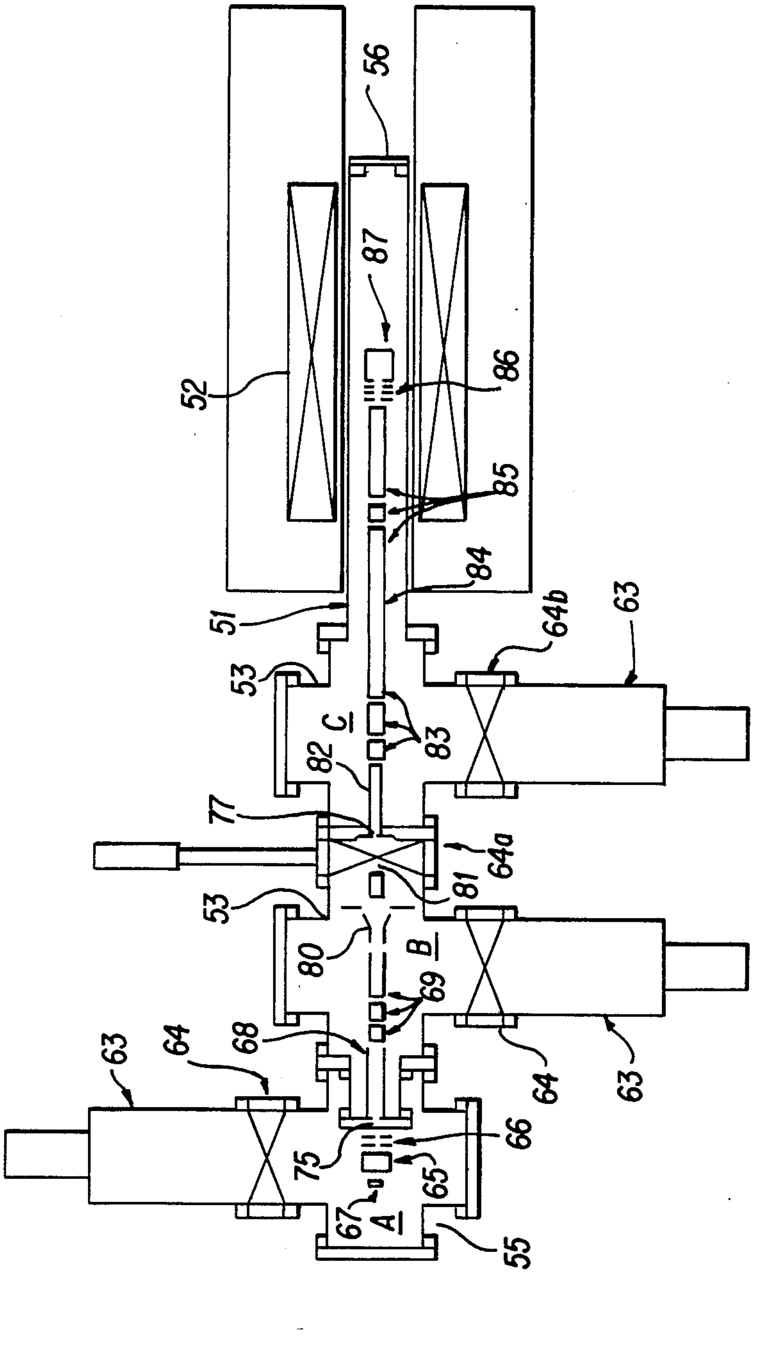
FIG. 7 is a schematic illustration of one embodiment of the Fourier transform ion cyclotron resonance mass spectrometer, shown in a cross-sectional view.

The Fourier transform ion cyclotron resonance mass spectrometer of the present invention is housed within a three-stage, differentially-pumped vacuum chamber, as shown in FIG. 7. Most of the vacuum-housing components were supplied by NOR-CAL Products Inc. The stainless-steel vacuum housing, 51, is assembled using three six-way tubular crosses 53 equipped with high-vacuum flanges and crushed-metal seals, and separated by 8" dia. tubular sections. A long tubular section 56 of the vacuum housing (5" dia.) is inserted into the 6" dia. bore of a cryogenic superconducting magnet (Oxford Instruments Inc. model 300/150 horizontal magnet equipped with a full set of cryogenic shim coils) 52, operating at a field strength of 7 Tesla (although other field strengths can be used also). The three regions of the vacuum chamber, A, B and C, are differentially pumped by three cryogenic vacuum pumps, 63 (CTI Cryogenics model CT-8). Cryogenic pumps were selected because of their ability to operate in a magnetic field (unlike turbo-molecular pumps), high pumping speeds, low ultimate pressures, complete absence of contaminating materials such as pump oils, and their ability to cope with a high throughput of chromatographic gases and solvents. The roughing-pump system comprising venturi and sorption pumps is not shown in FIG. 7. Each of the three vacuum pumps can be isolated from the vacuum housing 1, by an associated gate valve 64 (VAT Inc. ultra-high vacuum valves series 10, 200 mm). Also, the ultra-high vacuum chamber, region C, can be isolated from the rest of the system by a gate valve 64*a*.

Figure 8:
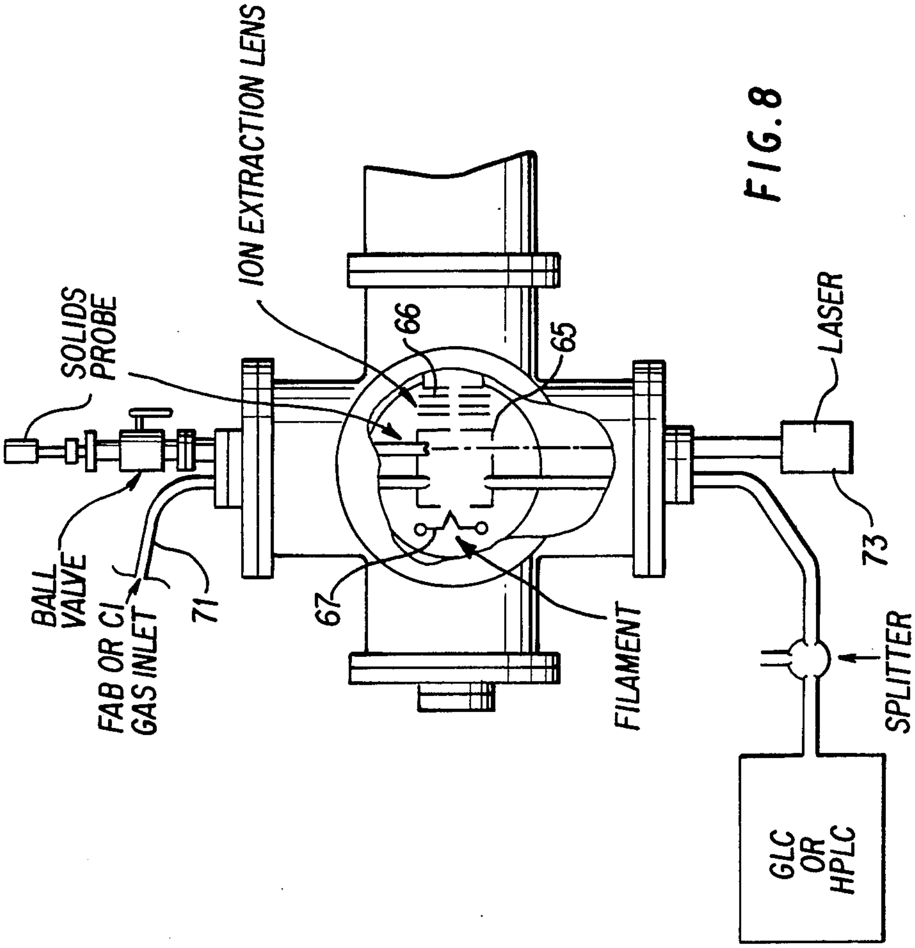
FIG. 8 is a schematic illustration of the sample inlet and ionization system.

The sample inlets (not shown in FIG. 7) for solid probe and chromatographic interfaces supply vaporized neutral molecules to the ion source 65, wherein the molecules are ionized either directly by an electron beam from the filament 67, (EI) or indirectly by chemical ionization (CI) using reagent-gas ions fed through inlet 71, or by a laser beam (LI) from Laser 73 or by fast-atom bombardment (FAB) through inlet 71, as illustrated by the sketch in FIG. 8. Separate interchangeable ion sources were constructed or purchased for each of these ionization schemes. For example, a combined EI/CI ion source was constructed by modification of an Extranuclear Laboratories model E2-1000 ion source, wherein the radial electron beam was changed to an axial beam by relocation of the filament and repeller plate, and an aperture was made in the removable ion-volume cup to permit entry of the axial beam. Note that not all of the components shown are not connected or used in the spectrometer at the same time. Interchangeable ion sources are used to provide versatility in sample introduction and ionization.

Referring to FIG. 7, the ion extraction lens 66, transports the ions from the first vacuum chamber to the second, wherein the ions enter a low-resolution mass filter 68 (a short RF quadrupole), to remove undesired low-mass ions such as carrier gas and solvent ions from the chromatographs, or chemical ionization reagent gas ions. The presence of these low-mass ions would increase the space charge in the ICR mass-analyzer, which would degrade resolution and cause the measured cyclotron frequency to shift. In the illustrated embodiment, The Extranuclear Laboratories model 7-162-8 quadrupole rods are equipped with ELFS on both ends (ELFS=Extranuclear Laboratories Field Separator, a leaky-dielectric device which causes gradual decay of the RF electric field near the rod-ends and complete blockage of DC electric fields, thereby collimating the emerging ions). The quadrupole filter is usually operated in the RF-only mode where it acts as a high-pass filter, although the RF/DC band-pass mode is available if needed for selective ion transmission. The quadrupole can also be disabled electronically for certain applications. It is noteworthy that the quadrupole filter is situated in a weak region (<0.001 Tesla) of the magnetic field, and that the ion trajectories are virtually unaffected by such a weak field.

A small orifice 75 between the extraction lens 66, and the filter 68, supports the pressure differential between the chambers A and B. An electrostatic three-element cylinder lens 69 provides focussing of the ion beam emerging from the quadrupole rods. Electrostatic steering plates 80 and 81 provide horizontal and vertical deflection of the beam, respectively, to maintain the position of the beam close to the principal axis of the magnetic field and to direct the beam through a second orifice 77 which supports the pressure-differential between the second and third vacuum chambers B and C.

A grid tube 82 provides an equipotential flight path for the ion beam. It is a cylinder of fine wire mesh held at the electrical potential of the ion beam. Its function is to shield the beam from the influence of stray electric fields, such as those arising from the vacuum housing at ground potential, and provides lower restriction to pumping than could be achieved with a solid tube. A pair of electrostatic three-element cylinder lenses 83 and 85 sharing a common element in a second equipotential grid tube 84, provide additional acceleration and focussing of the ion beam to transport the ions over a distance of one meter in vacuum region C, against a large magnetic field gradient. A three-element aperture deceleration lens 86 slows the beam to almost thermal velocity prior to entering the ion trapping cell 87. The ICR cell 87 comprises six electrically-isolated metal plates forming the sides of a box, with attached wiring to supply adjustable DC voltages to the plates and to conduct the excitation and response signals. (See FIG. 1) The various electrical connections to the mass spectrometer are brought into the vacuum housing by ceramic high-vacuum feedthroughs (supplied by Ceramaseal Inc.).

When the ions are present in the ICR cell 87, the voltage on the end plates 55 and 56 is raised to about 1

Volt to prevent escape of the ions in the z-direction. The magnetic and electric fields induce cyclotron and magnetron motions, which prevent loss of ions in the X-Y plane. Thus, the ions are effectively trapped within the volume of the ICR cell 87, where they can be observed over relatively long periods of time. The ICR cell is supplied optionally with positive or negative direction (DC) voltages for trapping positive or negative ions, and a pulsed alternating voltage for the excitation of the ions. The so-called "CHIRP" excitation is a radio-frequency pulse in which the frequency is swept rapidly during the pulse over a range sufficient to excite the mass-range of interest. Excitation corresponds to acceleration of the ionic motions to larger radii. The amplitude and duration of the CHIRP pulse determine the radii of the "parking orbits", the orbits in which the coherent ion motions are observed. The ionic motions induce a minute fluctuating electric current (the "image" current, see Wilkins et al. and Smith et al. supra) to flow between the opposing side plates of the cell and through external electronic circuitry in which the current is amplified and detected. The amplified image current is digitized and stored in the memory of a digital computer, where the time-domain transient signal is Fourier transformed to reveal the characteristic cyclotron frequencies and the accurate masses of the ions.

ELECTRONIC CIRCUITRY

The electronic circuitry in the spectrometer can be subdivided into the categories of ion-optics and chromatograph controllers, excitation circuitry, detection circuitry, and digital processing equipment. The organization of the analog and ditgital circuitry is illustrated by the block diagram in FIG. 9. The ion source controller is an Extranuclear Laboratories model C50-IC Ionizer Controller and the quadrupole mass filter is regulated by a model C50-MS Mass Command Electronics from the same vendor. The ion optics controllers 91 are highly stable programmable DC power supplies that supply voltages to the individual elements of the various electrostatic lenses, and to the walls of the ICR cell 87. These voltages are controlled by a host computer 92 through an array of thirty-two 12-bit digital-to-analog converters 94 (Micro Networks Inc. model DAC-HK2). The DAC 94 outputs are amplified by high voltage operational amplifiers (Apex Microtechnology model PA08) to supply programmable voltages ranging between −140 and +140 volts. The individual lens voltages can be adjusted manually (to optimize ion transmission) by rotation of a digital shaft encoder (Litton Industries model 81 BI-256-5-1), or alternatively under the control of the host computer 92 using a simplex-optimization program.

In the illustrated embodiment, the host computer 92 is a MOTOROLA BENCHMARK-20 TM 32-bit desk top computer based upon the MC68020 microprocessor and the MOTOROLA VERSAbus TM digital bus protocol. The spectrometer control software was written in PASCAL and MOTOROLA 68020 assembly language, using the VERSAdos TM real-time disc-operating system.

Figure 10:
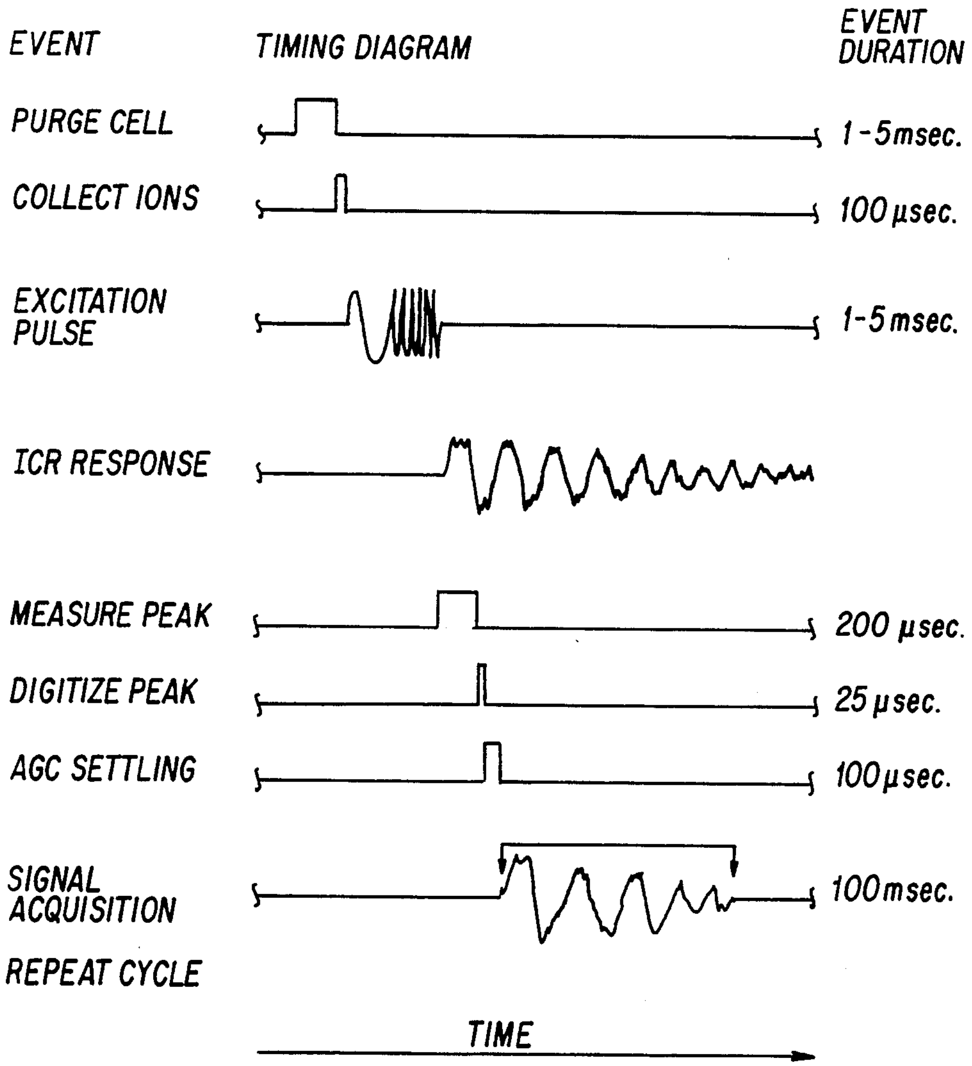
FIG. 10 is a diagram illustrating the timing of various events in the ion-trapping, excitation and acquisition sequence of a typical Fourier transform ion cyclotron resonance experiment. Representative durations for each of the events are given in the right-hand column.

The timing of various events in the spectrometer is determined by a programmable pulse generator 96, constructed using timers and counters available on standard large-scale integrated circuits. The pulse programmer is initialized by software in the host computer 92, and its carefully-timed output pulses are used to trigger several other electronic modules. A timing diagram for a typical FT-ICR experiment is shown in FIG. 10. The CHIRP excitation pulse originates in a digital frequency synthesizer 93 (Rockland model 5100), which can be swept at a predetermined rate between accurately known frequency limits, and programmed in amplitude, using the synthesizer programmer 100 [SPG]. The synthesizer programmer 100, fabricated from standard integrated circuits, is in turn controlled by the host computer 92, which sets the operating parameters for the experiment, and is triggered by the pulse programmer 96. The CHIRP pulse is applied to a differential RF transmitter 102, which is connected to two of the opposing side plates of the ICR cell 87. The oscillating electric field produced by the CHIRP voltage accelerates ions of a given mass into coherent orbital motion, which can be detected by the image current induced in the side plates of the cell.

The image current to be measured is very small, typically $10^{-12}$ Amps, and the detection circuitry includes a resistance R through which the image current flows. Since the ICR cell 87 represents a high-impedance, mostly capacitive signal-source, the value of the resistance R must be very large (108M Ohms) to avoid loading the source. The capacitance C of the ICR cell is small (typically 0.2–0.5 pF) and the cutoff frequency of this RC circuit must be low enough to allow passage of the frequencies corresponding to the mass range of interest. The small voltage (typically $10^{-4}$ volts) developed across the load resistance R is amplified by a differential pre-amplifier 104, which must have an extremely large input impedance, a low input capacitance, a low noise-figure and a wide band-width. A suitable field-effect transistor pre-amplifier was constructed with a gain of 300, a bandwidth of 1 kHz to 5 MHz, input capacitance of 0.25 pF, and impedance of $10^8$ Ohms. Further amplification takes place in subsequent gain stages, as discussed below.

Typical mass spectra contain a large range of peak-amplitudes, and chromatographic sources supply widely-varying sample sizes to the ion source. Thus, the ICR signal strength for a given ion can vary as much as one million fold. This imposes the requirement of an exceedingly large dynamic range on the main signal digitizer 106. At the required digitization rate of 5 MHz, the fast digitizers available currently are limited to a resolution of 12 bits at most, which corresponds to a dynamic range of only 4096:1. Consequently, a provision for controlled signal compression in the amplification chain is needed to increase the effective dynamic range of the digitization process. In the apparatus of the present invention, signal compression is achieved by means of a novel circuit for an automatic gain control amplifier 108, which ensures that the signal presented to the main digitizer 106 has ostensibly constant peak amplitude regardless of the number and type of ions in the ICF trapping cell (within certain practical limits), and that the dynamic range of the digitization process is maximized. To formulate this process algebraically, if the timing-varying ICR signal is designated V(t) and its initial peak-to-peak amplitude is Vpp, a constant peak amplitude $V_k$ is obtained by multiplying V(t) by a factor $F_s = V_k/Vpp$. Thus, a measurement of 1/Vpp is required.

Figure 11:
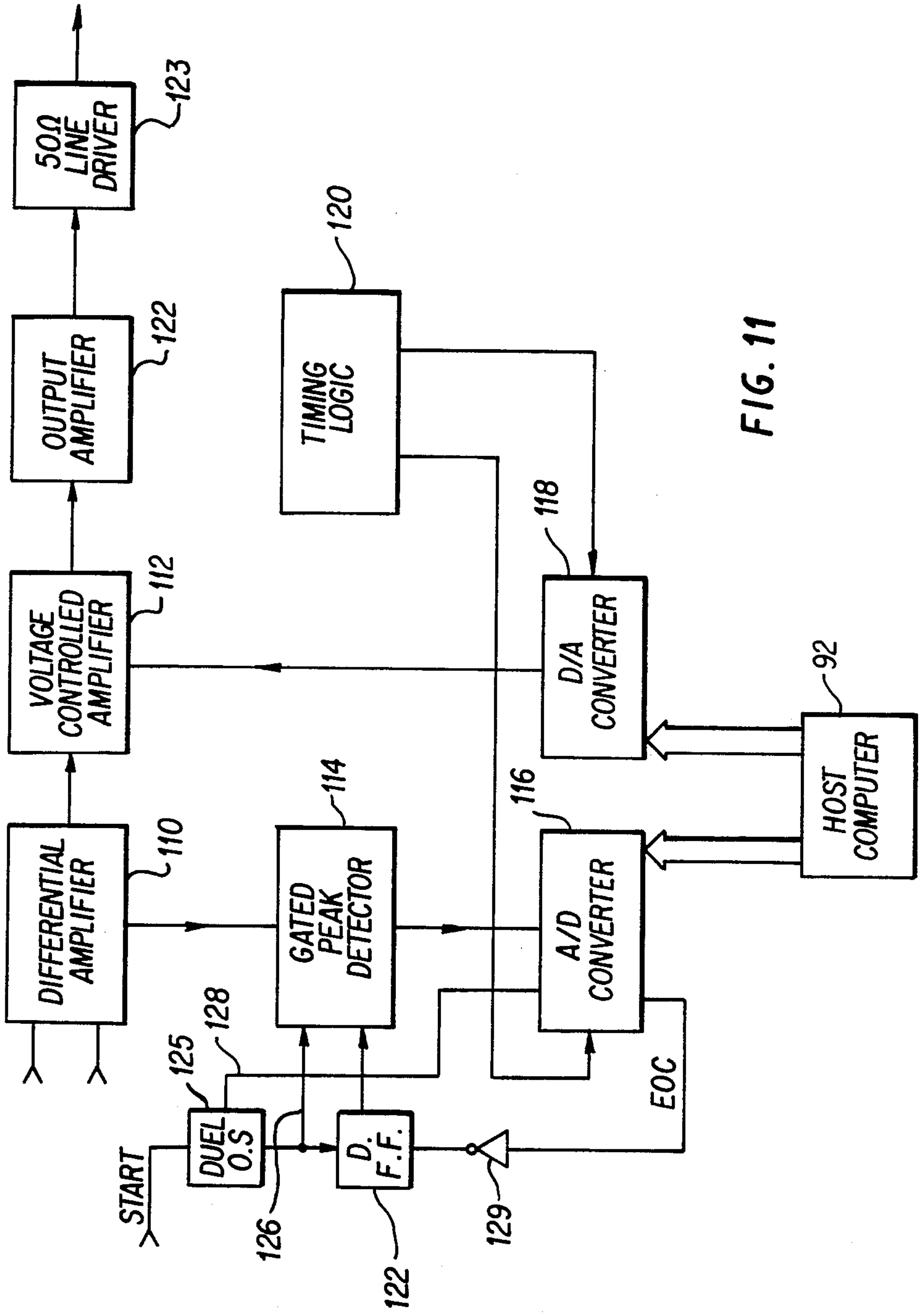
FIG. 11 is a block diagram for an automatic gain control (AGC) amplifier with a digital gain control element.

In the illustrated embodiment, an innovative automatic gain control circuit 108 incorporating a digital gain control element was designed and constructed. This module is shown as a functional block diagram in FIG. 11. This circuit contains a 20 dB signal amplifier 110 with differential inputs and outputs. One output is routed to a voltage controlled amplifier 112, and the other to a fast gated peak detector 114. Other circuit elements include a 12-bit analog-to-digital converter 116, a 12-bit digital-to-analog converter 118, TTL timing logic 120, and a signal output-amplifier 122. The gain of the VCA 112 must be adjustable over a range of at least 1000 by application of a DC control voltage. Moreover, the gain of the VCA 112 must be highly linear over the range of the applied control voltage, which is not the case for a large class of monolithic AGC amplifiers used commonly in radio frequency circuits. Consequently, a true four-quadrant multiplier (MOTOROLA integrated circuit MC1594) was selected for the VCA function, providing a linear gain range of ca. 80 dB. The fast gated peak-detector 114 is also based on a monolithic integrated circuit, a Precision Monolithics Inc. PKD-01 configured for bipolar signals. This circuit produces a DC output voltage equal to the peak-to-peak amplitude of the alternating input signal. Provided that a small DC offset (ca. 100 mV) is applied to the input to ensure that the internal diodes always conduct, this peak detector has adequate linearity over the required range of RF signals.

In AGC operation, the peak detector 114 is gated on for 200 microseconds by the timing logic 120, immediately after the CHIRP excitation pulse ends. During this sampling period, the initial peak-to-peak amplitude of the transient ICR signal is measured, as indicated in timing diagram in FIG. 10. The proportional DC output voltage of the peak detector cannot be used directly to set the gain of the VCA 112 because of its small-but-significant drift during the period of the data acquisition. Also, the required DC control voltage is inversely proportional to the peak amplitude and a divider circuit must be inserted between the gated peak detector 114 and the VCA 112. While in principle this could be done with analog circuit elements, it is more convenient and accurate to use digital circuitry. The DC output of gated peak detector 114 is digitized by the analog-to-digital converter 116 (Micro Networks Inc. integrated circuit ADC-80) in about 25 microseconds and the 12-bit binary representation of the peak amplitude is transferred to the host computer 92 for processing. The numerical scaling factor $F_s$ is evaluated by the computer and applied to the binary input of the 12-bit digital-to-analog converter 118, a Micro Networks Inc. integrated circuit DAC-HK. The analog voltage generated by the DAC 118 is scaled to the range 0–1 V by a potentiometer and applied to the X-input of the four-quadrant multiplier used as VCA 112. The ICR signal from differential amplifier is applied to the Y-input of the multiplier, which is configured for an overall gain of 10. The constant peak-amplitude signal from the multiplier (VCA 112) is applied to the output amplifier 122 (gain 100) which provides its output to a 50 Ohm line driver 123 for transmission to subsequent circuits. The signal scaling factor $F_s$ is stored along with each transient ICR signal in the host computer or on a magnetic disc, providing a means by which the true signal amplitudes can be restored during post-acquisition processing. Thus, accurate ion-chromatographs can still be generated.

The timing for the AGC operation is controlled by internal TTL logic circuitry comprising a dual one-shot multivibrator 125 (74LS221), a D-type flip-flop 127 and an inverter 129. A positive-edge logic transition provided by the pulse programmer 96 of FIG. 9 starts a 200 microsecond period output on line 126 of one shot 125 to define the peak detector sampling period. At the end of this period, a 100 nanosecond trigger pulse on line 128 is generated to start the analog-to-digital converter 116. The end-of-conversion pulse (EOC) from ADC 116 is used to initiate data transfer to the host computer 92 and to reset the peak detector 114 in preparation for the next transient. A logic pulse from the host computer 92 latches the digital-to-analog converter 118. The critical time interval between the end of the CHIRP pulse and the start of main signal acquisition remains under the control of the pulse programmer 96 to ensure coherent signal averaging.

Other advantages of the digital AGC circuit are apparent. For example, rather than using the simple scaling factor $F_s$ as defined above, a calibration polynomial function or a look-up table can be used to correct any non-linearities in the analog circuitry. Also, since the gain of the amplifier is intrinsically under the control of the computer, automatic apodization of the transient signal can be done in real time.

Figures 9A, 9B:
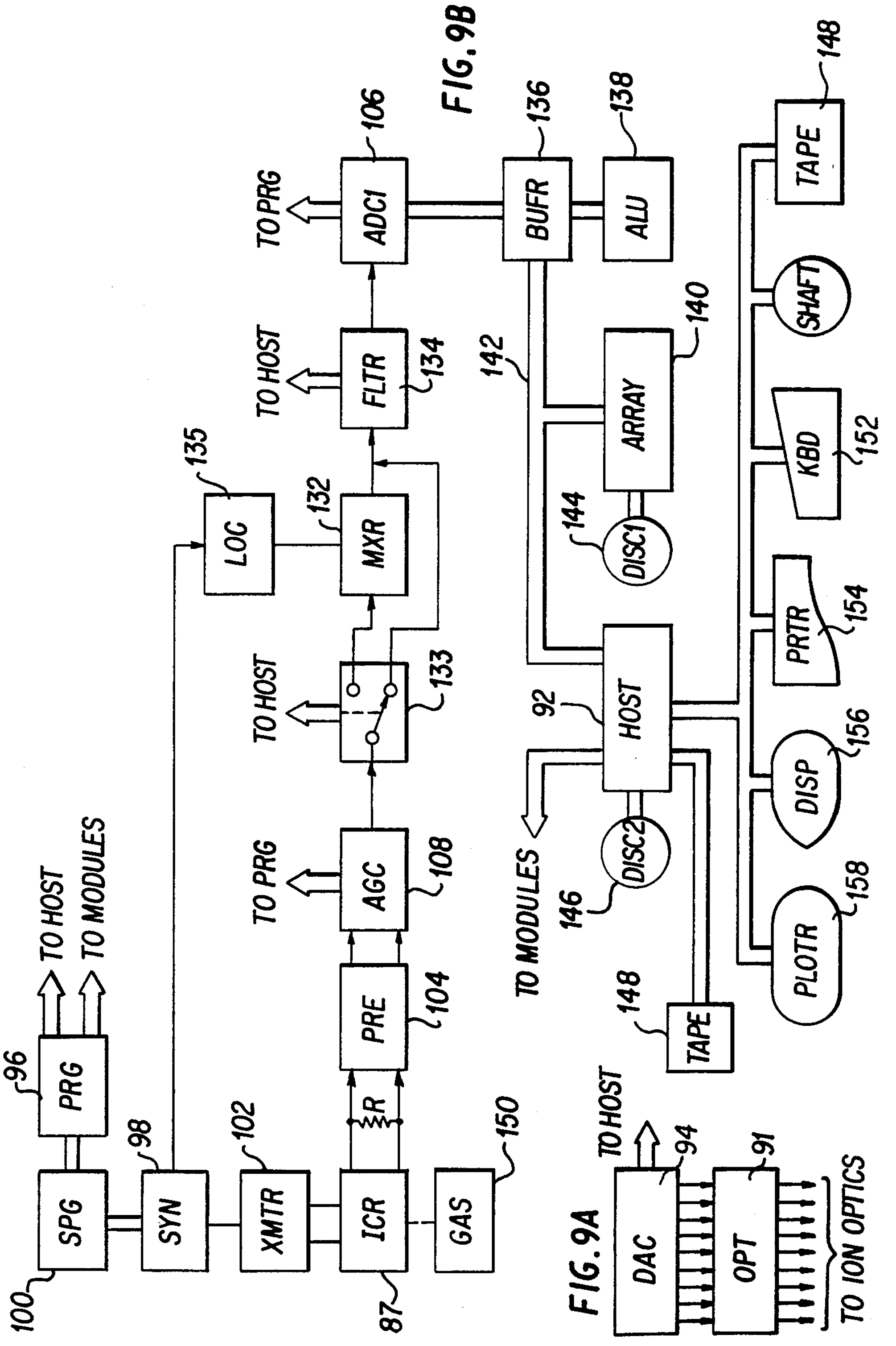
FIG. 9 is a block diagram of the interconnection of essential electronic components in the illustrated embodiment of the inventive apparatus.

Between the autoranging automatic gain control amplifier 108 and the main-signal digitizer 106, two additional circuits are inserted, as shown in FIG. 9. These circuits are a double balanced mixer 132, which can be switched into or out of the signal path by switch 133, and a programmable low-pass filter 134. Together, these provide operation of the spectrometer in a heterodyne or narrow-band mode. The ICR signal can be mixed (heterodyned) with a reference signal from a local oscillator 135 in order to narrow the bandwidth of the observed frequencies, and hence increase the mass resolution of the experiments. Heterodyning produces both sum and difference frequencies, and the sum components are largely removed by the low pass filter 134. The filter can also be used independently of the mixer to remove high frequency noise components from the ICR signal.

As mentioned above, the ICR apparatus utilizes a 12-bit analog-to-digital converter 106 (Analog Devices Inc. MOD-1205) operating at frequencies up to 5 MHz. The conventional laboratory computer 92 is incapable of accepting information acquired at this high speed, as well as performing numerous control and processing functions in the spectrometer. Consequently, a high-speed (200 MB/sec burst rate), partitionable buffer memory 136 with add/subtract arithmetic capability (provided by an arithmetic logic unit 138, [ALU]) is used to accept the digitized interferogram and provide signal-averaging capability. This fast signal-averager was constructed by modification of WideWord™ bulk memory module manufactured by DATARAM Inc. At least a megaword of 32-bit memory is needed to provide sufficient digital resolution for analytical ICR experiments. A one-megaword memory would limit the mass resolution to 21,000 in a wide-range spectrum from mass 100 to 600 Daltons with data acquisition at a frequency of 2 MHz. To achieve higher resolution would require operation in the heterodyne (mixer) mode.

The stringent data processing requirements of the experiment impose severe demands on the performance of the digital computer 92. The large data arrays must be Fourier transformed in a time on the order of one second, which is beyond the capability of the host computer. This short processing time is necessary to avoid loss of information from ephemeral chromatographic samples (capillary GC and microbore LC peaks have half widths of only a few seconds). Consequently, a pipelined vector arithmetic processor, also called an array processor, 190, must be used to achieve the required processing time. In the illustrated embodiment of the invention, the host computer 92, the buffer memory 136, and the array processor 92 (a fast vector arithmetic processor supplied by SKY Computers Inc.) share a common bus 142 (based on the MOTOROLA VERSAbus TM protocol) to maximize the data throughput rate.

The large data arrays acquired in these experiments require large mass-media storage. For example, a 500 MByte magnetic disc 144 used for storage of unprocessed ICR interferograms can be filled completely in single chromatographic experiments. A smaller magnetic disc 146 provides storage for the frequency domain spectra because only information on ionic mass and amplitude need to be saved. Streaming magnetic tape 148 is used for archiving the spectra.

Ion-molecule reactions can be studied in the ICR cell by injecting a pulse of a collision gas. In the illustrated apparatus, this is achieved using a solenoidal pulsed gas valve 150, (Maxtec Inc. model MV-112 piezoelectric gas valve), which is actuated under the control of the pulse programmer 96. This valve 150 provides a momentary high pressure (ca. $10^{-3}$ torr) of a reagent gas during which the ion-molecule reactions take place. The valve can be opened for as little as 0.001 s, and the high vacuum is quickly restored by the cryo-pump for low-pressure observation of the ICR signal of the product ions.

The other modules shown in FIG. 9 require no discussion: the computer keyboard 152, the printer 154, the raster-scan graphics-display oscilloscope 156, and the digital plotter 158 are all standard commercial items used in conventional applications.

What is claimed is:

1. A Fourier transform ion cyclotron resonance mass spectrometer, for measuring accurate masses of positively and negatively ionized molecules from a vaporized chemical sample comprising:

(a) a vacuum housing divided into first, second and third differentially-pumped vacuum regions, separated by apertures, in order of decreasing internal pressure;

(b) means to introduce, vaporize, and ionize chemical materials in said first region of said vacuum housing;

(c) means for the extraction of ions from said means to introduce, vaporize and ionize, and for transporting said ions from said first region to said second region of said vacuum housing;

(d) means to produce a strong, homogeneous magnetic field having a principal axis lying within said third region of said vacuum housing and having an inhomogeneous fringing region extending into said second region;

(e) an electrostatic element cylinder lens to focus, accelerate and guide the ions along said principal axis of said magnetic field, in the inhomogeneous fringing region of the field, and through the aperture separating said second and third regions of said vacuum housing;

(f) means to decelerate the ions to near-thermal velocity in a homogeneous part of said magnetic field;

(g) an ion cyclotron resonance mass analyzer cell means to trap the ions in a confined volume of space, situated in the third region of said housing, in the homogeneous part of said strong magnetic field;

(h) means to introduce a pulsed reagent gas into said cell means to induce reactive collisions;

(i) means for providing an oscillating electic field to accelerate the trapped ions into larger orbital radii, for creating observable coherent motions of the ions; and (j) means to render observable the characteristic frequencies of the orbital motions of the trapped ions, such that ionic masses can be calculated.

2. A spectrometer according to claim 1 and further including means to remove unwanted ions from an ionized sample.

3. A spectrometer according to claim 1 and further including means to operate in a heterodyne or narrow-band mode to improve mass-resolution.

4. A spectrometer according to claim 1 wherein said vacuum housing comprises three, six-way flanged tubular crosses, interconnected by tubular sections and separated by small orifices into said first second and third regions and first, second and third cryogenic high-vacuum pumps, means for pumping said first, second and third regions.

5. Apparatus according to claim 1, wherein said means to introduce include means for the introduction and vaporization of solid chemical samples.

6. Apparatus according to claim 1 wherein said means to introduce include means for the introduction of chemical samples dissolved in gas and liquid carriers originating in chromatographic separators, and means to ionize said sample molecules.

7. Apparatus according to claim 2, wherein said means to remove unwanted ions comprise a low-resolution mass filter, comprising short electric-quadrupole rods equipped with leaky-dielectric field separators on both ends, to eliminate unwanted low-mass ions and to provide single-ion transmission selectively.

8. Apparatus according to claim 7, wherein said electrostatic element cylinder lens means focuses the ion beam emerging from said quadrupole rods, and further including two pairs of electrostatic deflection plates, oriented horizontally and vertically to guide the ion beam through the aperture between said second and third regions of vacuum housing.

9. Apparatus according to claim 8, wherein said means to focus accelerate and guide further include a pair of three-element electrostatic cylinder lenses, which accelerate and focus the ions emerging from the aperture between said second and third regions into a tightly-collimated beam to transport the ions through said third region of the vacuum housing, wherein the ions gain sufficient velocity along the principal axis of the magnetic field to overcome certain natural repulsive forces arising from their motion along a magnetic field gradient.

10. Apparatus according to claim 9, wherein said means to decelerate comprise an electrostatic three-element aperture retardation lens means, located in front of said cell, to decelerate the ions to thermal velocity prior to entering the cell, wherein efficient ion trapping is facilitated.

11. Apparatus according to claim 10, wherein said ion cyclotron resonance mass analyzer cell means comprises six electrically-isolated metal plates forming a box and situated in said third region of the apparatus, and inserted into the homogeneous part of said strong magnetic field, trapping the ions within the confines of the cell, due to forces originating in electric and magnetic fields, wherein the presence, abundance, and masses of the trapped ions may be determined.

12. Apparatus according to claim 11, wherein said means to render observable includes a variable-gain electronic amplification circuit with a digital gain-control element means for the detection of ICR image current, said variable gain circuit providing automatic regulation of the amplitude of the signal, said variable gain circuit operating such that the signal amplitude is first measured in a short time interval and the gain of the amplifier is set proportionately and held constant during a longer signal-acquisiton period, so that the output signal of the variable gain circuit has ostensibly the same amplitude, regardless of the abundance of ions trapped in the cell such that the range of measurable signal amplitudes in chromatographic mass spectrometric experiments is improved.

13. Apparatus according to claim 12 and further including a local oscillator means and a means for mixing the ICR signal with an alternating voltage supplied by said local oscillator means for, narrowing the observed mass-range and providing improved resolution and mass accuracy.

14. Apparatus according to claim 12, including means to digitize the output of said variable gain circuit, and further including means for storage and numerical signal-averaging of the digitized output of said variable gain circuit in exceptionally large data arrays, including a partitionable ultra-high-speed buffer memory and arithmetic-logic circuitry, such that the resolution and mass-accuracy obtained in the mass spectral measurements are increased.

15. Apparatus according to claim 14, and further including a digital vector arithmetic processor means, programmed to provide ultra-high-speed Fourier transformation and other mathematical operations, such that exceptionally large data arrays can be acquired and processed in a time-period compatible with ephemeral chromatographic sample-sources and rapid-vaporization direction-insertion probes.

16. A Fourier transform ion cyclotron resonance mass spectrometer, for measuring accurate masses of positively and negatively ionized molecules from a vaporized chemical sample comprising:

(a) a vacuum housing divided into first, second and third differentially-pumped vacuum regions, separted by apertures, in order of decreasing internal pressure;

(b) means to introduce, vaporize, and ionize chemical materials in said first region of said vacuum housing;

(c) a three-element electrostatic aperture lens means for the extraction of ions from said first region and to transport said ions to said second region;

(d) means to produce a strong, homogeneous magnetic field having a principal axis lying within said third region of said vacuum housing and having an inhomogeneous region extending into said second region;

(e) a first electrostatic three-element cylinder lens means for focussing the ions, and two pairs of electrostatic deflection plates, oriented horizontally and vertically to focus, accelerate and guide the ions through the aperture between said second and third regions of the vacuum housing; and an additional pair of three element electrostatic cylinder lens means to accelerate and focus the ions emerging from the aperture between said second and third regions into a tightly-collimated beam and to transport the ions through said third region of the vacuum housing, wherein the ions gain sufficient velocity along the principal axis of the magnetic field to overcome certain natural repulsive forces arising from their motion along a magnetic field gradient;

(f) an electrostatic three-element aperture retardation lens mean, to decelerate the ions to thermal velocity in the a homogeneous part of said magnetic field;

(g) an ion cyclotron resonance mass analyzer cell means to trap the ions in a confined volume of space, situated in the third ultra-high vacuum chamber region of said housing, in the homogeneous part of said strong magnetic field;

(h) means to introduce a pulsed reagent gas into said cell to induce reactive collisions;

(i) means for providing an oscillating electric field to accelerate the trapped ions into larger orbital radii, for creating observable coherent motions of the ions; and (j) means to render observable the characteristic frequencies of the orbital motions of the trapped ions, sure that ionic masses can be calculated.

17. A spectrometer according to claim 16 and further including means to remove unwanted ions from the ionized sample.

18. Apparatus according to claim 17, wherein said means to remove unwanted ions comprises a low-resolution mass filter, comprising short electric-quardrupole rods equipped with leaky-dielectric field separators on both ends, to eliminate unwanted low-mass ions and to provide single-ion transmission selectively.

19. Apparatus according to claim 18, wherein said ion cyclotron resonance mass analyzer cell means comprises six electrically-isolated metal plates forming a box and situated in said third ultra-high vacuum chamber region of the apparatus, and inserted into the homogeneous part of said strong magnetic field, trapping the ions within the confines of the cell means, due to forces originating in electric and magnetic fields, wherein the presence, abundance, and masses of the trapped ions may be determined.

20. Apparatus according to claim 19, wherein said means to render observable includes a variable-gain electronic amplification circuit with a digital gain-control element means for the detection of ICR image current, said variable gain circuit providing automatic regulation of the amplitude of the signal, said variable gain circuit operating such that the signal amplitude is first measure in a short time interval and the gain of the amplifier is set proportionately and held constant during a longer signal-acquisiton period, so that the output signal of said variable gain circuit has ostensibly the same amplitude, regardless of the abundance of ions trapped in the cell means such that the range of measurable signal amplitudes in chromatographic mass spectrometric experiments is improved.

21. Apparatus according to claim 1 wherein said means for the extraction of ions from said means to introduce, vaporize and ionize comprises a three-element electrostatic aperture lens means for the extraction of ions from said means to introduce and ionize.

22. Apparatus according to claim 21 wherein said electrostatic element cylinder lens means to focus, accelerate and guide the ions along said principal axis of said magnetic field is an electrostatic three-element lens.

23. In a Fourier transform ion cyclotron resonance mass spectrometer, for measuring accurate masses of positively and negatively ionized molecules from a vaporized chemical sample in which a sample is introduced, ionized, the ions transmitted to a trapping cell where mass analysis is carried out, improvement apparatus to render observable the characteristic frequencies of the orbital motions of the trapped ions, to provide an ICR signal comprising;

a variable-gain electronic amplification circuit with a digital gain-control element means for the detection of the image current of the trapped ions, said variable gain circuit includes means to provide automatic regulation of the amplitude of the signal, and timing means for causing said variable gain circuit to operate such that the signal amplitude is first measured in a short time interval and the gain of the amplifier is set proportionately and held constant during a longer signal-acquisition period, so that the output signal of said variable gain circuit has ostensibly the same amplitude, regardless of the abundance of ions trapped in a cell such that the range of measurable signal amplitudes in chromatographic mass spectrometric experiments is improved.

24. Apparatus according to claim 23 and further including means to digitize the output of said variable gain circuit.

25. Apparatus according to claim 23 and further including a local oscillator means and a means for mixing the output of said variable gain circuit with an alternating voltage supplied by said local oscillator means, for narrowing the observed mass-range and providing improved resolution and mass accuracy.

26. Apparatus according to claim 24, and further including means for storage and numerical signal-averaging of the digitized output of said variable gain circuit in exceptionally large data arrays, including a partitionable ultra-high-speed buffer memory and arithmetic-logic circuitry, such that resolution and mass-accuracy obtained in the mass spectral measurements are increased.

27. Apparatus according to claim 26, and further including a digital vector arithmetic processor means, programmed to provide ultra-high-speed Fourier transformation and other mathematical operations, such that exceptionally large data arrays can be acquired and processed in a time-period compatible with ephemeral chromatographic sample-sources and rapid-vaporization direction-insertion probes.

28. Apparatus according to claim 23 wherein said variable gain circuit comprises:

(a) a voltage controlled amplifier means;
(b) a differential amplifier means for coupling the ICR signal to said voltage controlled amplifier;
(c) a gated peak detector means for receiving an output from said differential amplifier means;
(d) means for scaling the output of said gated peak detector means, said means for scaling providing its output as a gain control input to said voltage controlled amplifier means.

29. Apparatus according to claim 28 wherein said means for scaling comprises:

(a) an analog to digital converter means for converting the output of said peak detector means to a digital signal;
(b) a digital computer means programmed to receive said digital signal and provide a scaled digital output; and
(c) a digital to analog converter means having said scaled digital output as an input and providing its output to said voltage controlled amplifier means.

* * * * *